T. F. ALLYN.

Car Spring.

No. 2,314.

Reissued July 17, 1866.

Witnesses:

C. L. Garner

Jno. L. Smithmyer

Inventor:

T. F. Allyn

AM. PHOTO-LITHO. CO. N.Y. (OSBORNE'S PROCESS.)

UNITED STATES PATENT OFFICE.

T. F. ALLYN, OF CANANDAIGUA, NEW YORK.

IMPROVED CAR-SPRING.

Specification forming part of Letters Patent No. 48,250, dated June 20, 1865; antedated March 28, 1865; Reissue No. 2,314, dated July 17, 1866.

*To all whom it may concern:*

Be it known that I, T. F. ALLYN, of Canandaigua, in the county of Ontario and State of New York, have invented a new and useful Improvement in Car-Springs; and I do hereby declare that the following is a full and exact description thereof, reference being had to the accompanying drawings, and to the letters of reference marked thereon.

Figure 1:
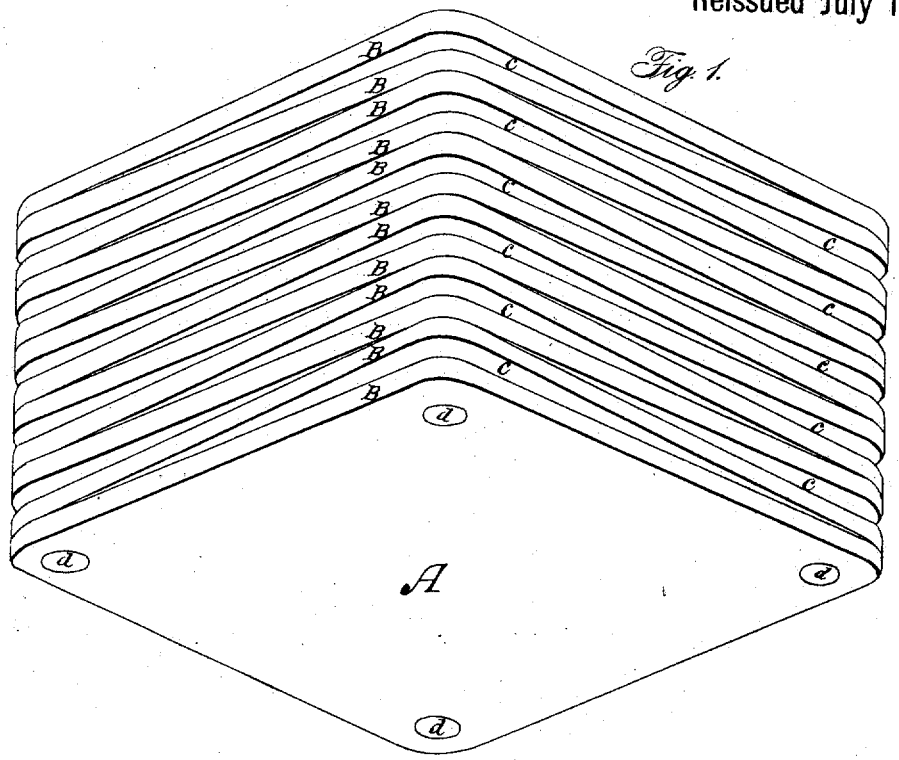
Figure 2:
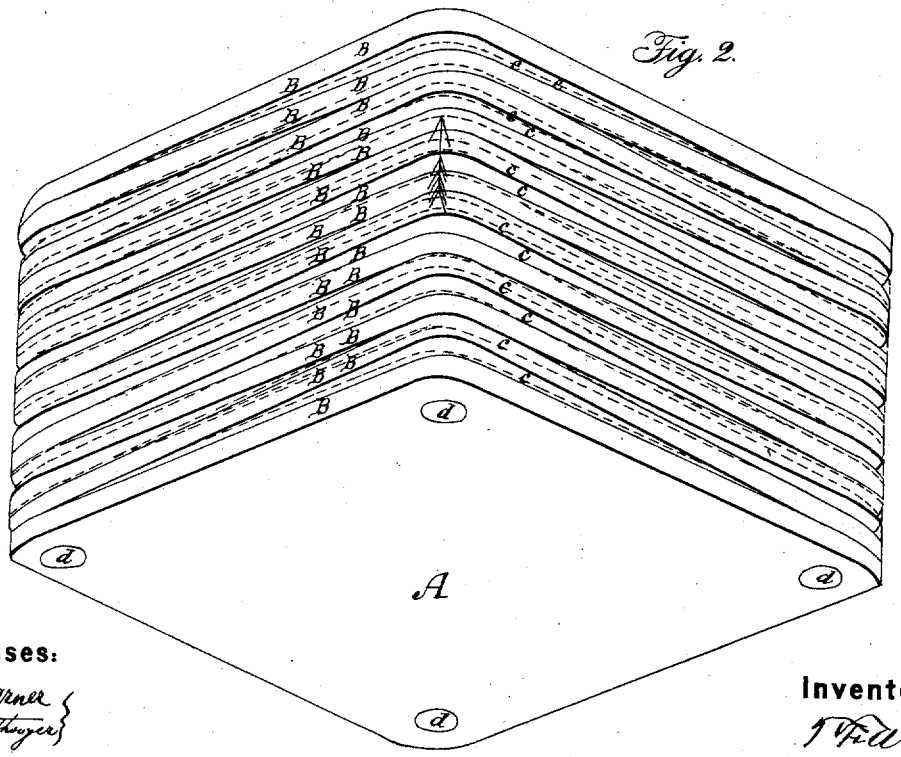

Figure 1 is a perspective view of the car-spring embodying my invention. Fig. 2 is also perspective view of the same, being represented under pressure.

The nature of my invention consists in a car-spring constructed of rectangular, rhombic, or similar-shaped metallic plates, which are curved or bent diagonally, so as to have central and end or corner bearings and fastenings.

The advantages of the diagonally-bent plates of the character named are thus: the bearings of my spring being diagonally through the center and at the corners or ends of the plates, the spring has proportionate strength at all points from the central to the outside bearings or fulcra.

To enable others skilled in the art to apply or use my diagonally curved or bent plates in the construction of a car-spring, I will proceed to describe one mode of employing such plates in that connection.

I construct my spring of plates about ten inches square, either in a square, rhombic, or other equivalent shape. The size and thickness of the plates may be more or less; but I generally use plates about one-fourth of an inch thick and ten inches square. I bend these plates diagonally in one direction between formers or dies. The plates may be bent when cold, or nearly so, by passing them between rollers; but I prefer that they be moderately heated when shaped by formers or dies. Each spring is formed of plates connected together at their diagonal corners or ends with rivets *d d*, or any other proper manner. If I desire to increase the volume of a spring made of these plates, I pile them up one upon another, as represented, and fasten the springs alternately together, and hold them in place by means of rivets or other devices; and if I desire to have greater strength in each spring I either make the plates thicker or use two or more thinner plates, as may be desired. I prefer the latter way, as it gives greater elasticity and strength in a given thickness.

The springs I apply so that they have diagonal, central, and end or corner bearings.

What I claim as my invention, and desire to secure by Letters Patent, is—

The construction of a metallic car-spring of rectangular, rhombic, or other equivalent-shaped plates, which plates are curved diagonally and have central and end or corner bearings and fastenings, substantially as and for the purpose set forth.

T. F. ALLYN.

Witnesses:

EDM. F. BROWN,

HENRY SYLVESTER.